United States Patent
Park et al.

(10) Patent No.: US 10,300,878 B2
(45) Date of Patent: May 28, 2019

(54) AIR BAG DEVICE FOR CAR

(71) Applicant: Hyundai Mobis Co., Ltd., Seoul (KR)

(72) Inventors: Hae Kwon Park, Yongin-si (KR); Jiwoon Song, Yongin-si (KR); Ga Ram Jeong, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 157 days.

(21) Appl. No.: 15/598,061

(22) Filed: May 17, 2017

(65) Prior Publication Data

US 2017/0334386 A1  Nov. 23, 2017

(30) Foreign Application Priority Data

May 20, 2016 (KR) ........................ 10-2016-0062397

(51) Int. Cl.
| | | |
|---|---|---|
| *B60R 21/207* | (2006.01) | |
| *B60R 21/2338* | (2011.01) | |
| *B60R 21/217* | (2011.01) | |
| *B60R 21/231* | (2011.01) | |
| *B60R 21/015* | (2006.01) | |

(52) U.S. Cl.
CPC ...... *B60R 21/207* (2013.01); *B60R 21/01512* (2014.10); *B60R 21/2171* (2013.01); *B60R 21/231* (2013.01); *B60R 21/2338* (2013.01); *B60R 2021/23161* (2013.01); *B60R 2021/23388* (2013.01)

(58) Field of Classification Search
CPC ............ B60R 21/207; B60R 21/01512; B60R 21/2171; B60R 21/231; B60R 21/2338; B60R 2021/23388; B60R 2021/23161
See application file for complete search history.

(56) References Cited

U.S. PATENT DOCUMENTS

| | | | | |
|---|---|---|---|---|
| 7,275,763 B2* | 10/2007 | Thomas | ................ | B60R 21/276 280/736 |
| 7,690,683 B2* | 4/2010 | Parks | .................... | B60R 21/239 280/739 |
| 8,777,260 B2* | 7/2014 | Kranzle | ................ | B60R 21/217 280/739 |
| 9,205,798 B1* | 12/2015 | Jindal | ..................... | B60R 21/16 |
| 9,650,011 B1* | 5/2017 | Belwafa | ................ | B60R 21/233 |
| 2009/0302588 A1* | 12/2009 | Schramm | .............. | B60R 21/233 280/743.2 |
| 2011/0309605 A1* | 12/2011 | Kumagai | ............ | B60R 21/2338 280/741 |

(Continued)

FOREIGN PATENT DOCUMENTS

| | | | | |
|---|---|---|---|---|
| KR | 2012-0045647 | | 5/2012 | |
| WO | WO-2016050733 A1 * | | 4/2016 | ........... B60R 21/239 |

*Primary Examiner* — Darlene P Condra
(74) *Attorney, Agent, or Firm* — H.C. Park & Associates, PLC

(57) ABSTRACT

An airbag device for a car may include an inflator positioned between first and second seats and generating an operating gas, a chamber part receiving the operating gas generated by the inflator and expanding between the first and second seats, a tether part connected to the chamber part to control a deployment shape of the chamber part, and a locking release part connected to the tether part at an inner surface or side surface of the chamber part which removes the connection to the tether part according to a control signal.

9 Claims, 10 Drawing Sheets

(56) References Cited

U.S. PATENT DOCUMENTS

| | | | |
|---|---|---|---|
| 2012/0242069 A1* | 9/2012 | Parks | B60R 21/2338 |
| | | | 280/743.2 |
| 2016/0039385 A1* | 2/2016 | Watamori | B60R 21/23138 |
| | | | 280/730.1 |
| 2016/0167616 A1* | 6/2016 | Wiik | B60R 21/23138 |
| | | | 280/729 |
| 2017/0158160 A1* | 6/2017 | Sugimori | B60R 21/207 |
| 2017/0274063 A1* | 9/2017 | Carra | A61K 39/12 |
| 2017/0334390 A1* | 11/2017 | Song | B60R 21/207 |
| 2018/0043853 A1* | 2/2018 | Taguchi | B60R 21/20 |

\* cited by examiner

AIR BAG DEVICE FOR CAR

CROSS-REFERENCES TO RELATED APPLICATION

This application claims priority from and the benefit of Korean Patent Application No. 10-2016-0062397, filed on May 20, 2016, which is hereby incorporated by reference for all purposes as if set forth herein.

BACKGROUND

Field

Exemplary embodiments relate to an airbag apparatus for a car. More particularly, exemplary embodiments relate to an airbag device for a car, which is capable of reducing injuries of occupants by deploying a cushion in a different manner depending on the number of occupants when a side collision of the car occurs.

Discussion of the Background

In general, an airbag for a car refers to a safety device that reduces an impact applied to an occupant by deploying an airbag cushion when a collision accident occurs. The airbag for a car may be divided into DAB (Driver Air-Bag), PAB (Passenger Air-Bag), SAB (Side Air-Bag), CAB (Curtain Air-Bag), and the like.

When occupants are seated in both a driver seat and a passenger seat, an airbag may be deployed between the driver seat and the passenger seat, and thus prevent a collision between the occupants seated in the driver seat and the passenger seat.

In the related art, an airbag between occupants is deployed in the same shape in both a single mode and a dual mode. The single mode refers to a mode in which an occupant is seated only in a driver seat, and the dual mode refers to a mode in which occupants are seated in the driver seat and passenger seat. Therefore, when a side collision of the car occurs, the occupant may be excessively moved in the single mode. In this case, the injury of the occupant may be increased. Therefore, there is a demand for a structure capable of solving such a problem.

The related art of the present invention is disclosed in Korean Patent Publication No. 2012-0045647 published on May 9, 2012 and entitled "Airbag device for passenger seat."

The above information disclosed in this Background section is only for enhancement of understanding of the background of the invention and, therefore, it may contain information that does not constitute prior art.

SUMMARY

Exemplary embodiments of the present invention provide an airbag device for a car, which is capable of reducing injuries of occupants by deploying a cushion in a different manner depending on the number of occupants when a side collision of the car occurs.

Additional features of the invention will be set forth in the description which follows, and in part will be apparent from the description, or may be learned by practice of the invention.

In an exemplary embodiment, an airbag device for a car may include an inflator positioned between first and second seats and generating an operating gas, a chamber part receiving the operating gas generated by the inflator and expanding between the first and second seats, a tether part connected to the chamber part to control a deployment shape of the chamber part, and a locking release part connected to the tether part at an inner surface or side surface of the chamber part which removes the connection to the tether part according to a control signal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
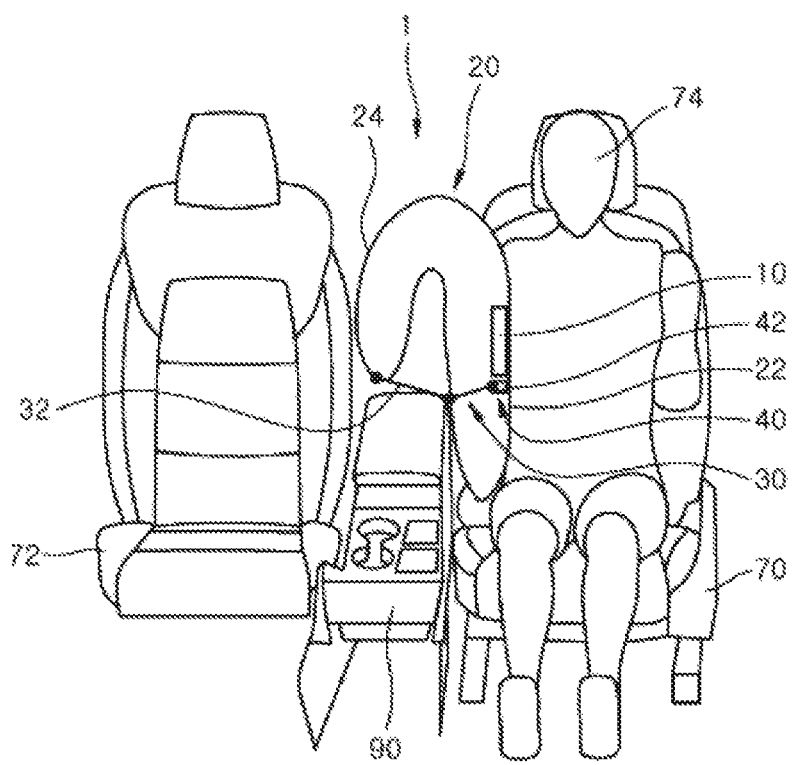
FIG. 1 is a front view schematically illustrating a state in which an airbag device for a car in accordance with an exemplary embodiment of the present invention is installed.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Various advantages and features of the present invention and methods accomplishing thereof will become apparent from the following description of embodiments with reference to the accompanying drawings. However, the present invention is not be limited to the embodiments set forth herein but may be implemented in many different forms. The present embodiments may be provided so that the disclosure of the present invention will be complete, and will fully convey the scope of the invention to those skilled in the art and therefore the present invention will be defined within the scope of claims.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise," "configure," "have," or the like, which are described herein, will be understood to imply the inclusion of the stated components, and therefore should be construed as including other components, and not the exclusion of any other elements.

Figure 2:
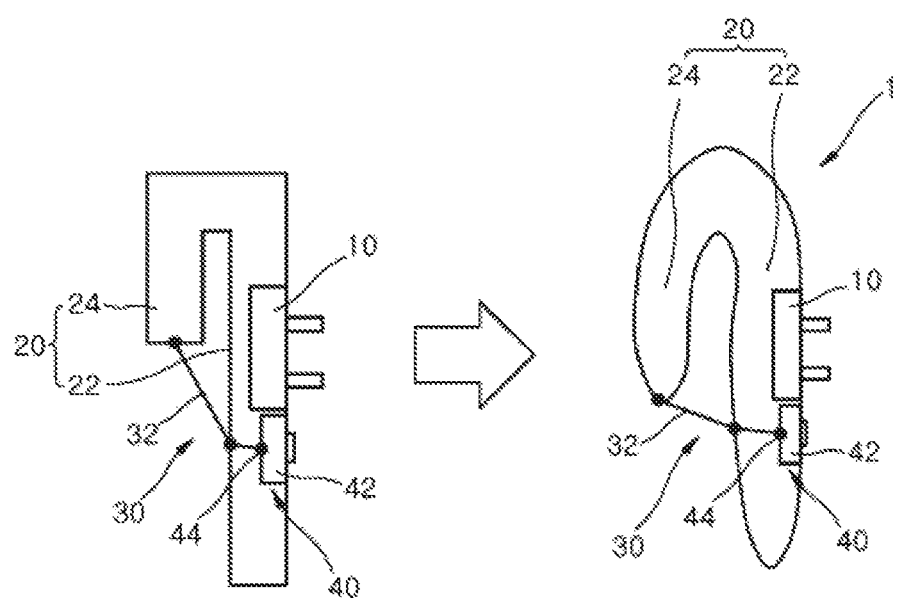
FIG. 2 is a front view schematically illustrating a state in which the airbag device for a car in accordance with an exemplary embodiment of the present invention is operated in a single mode.
Figure 3:
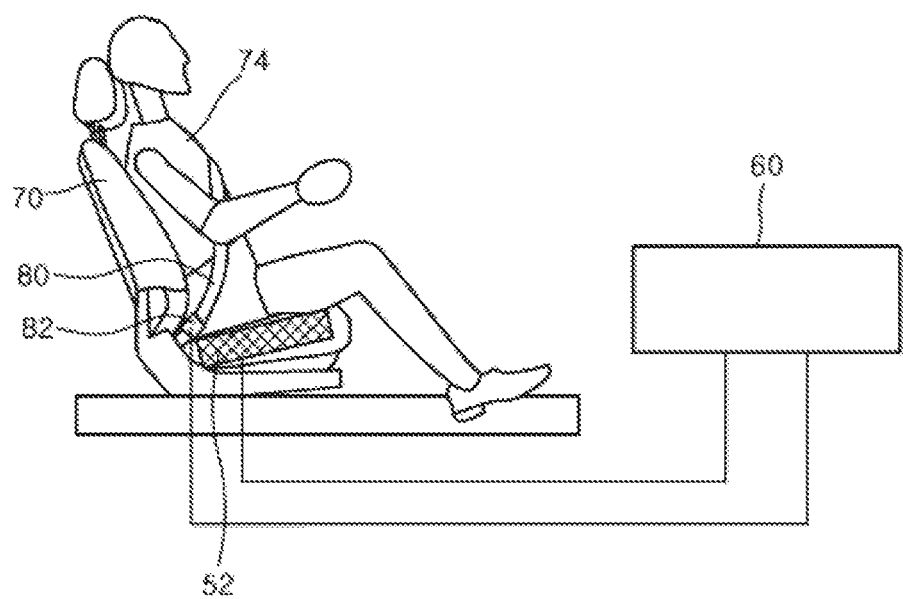
FIG. 3 is a diagram schematically illustrating a state in which a seat sensor in accordance with the exemplary embodiment of the present invention is installed.
Figure 4:
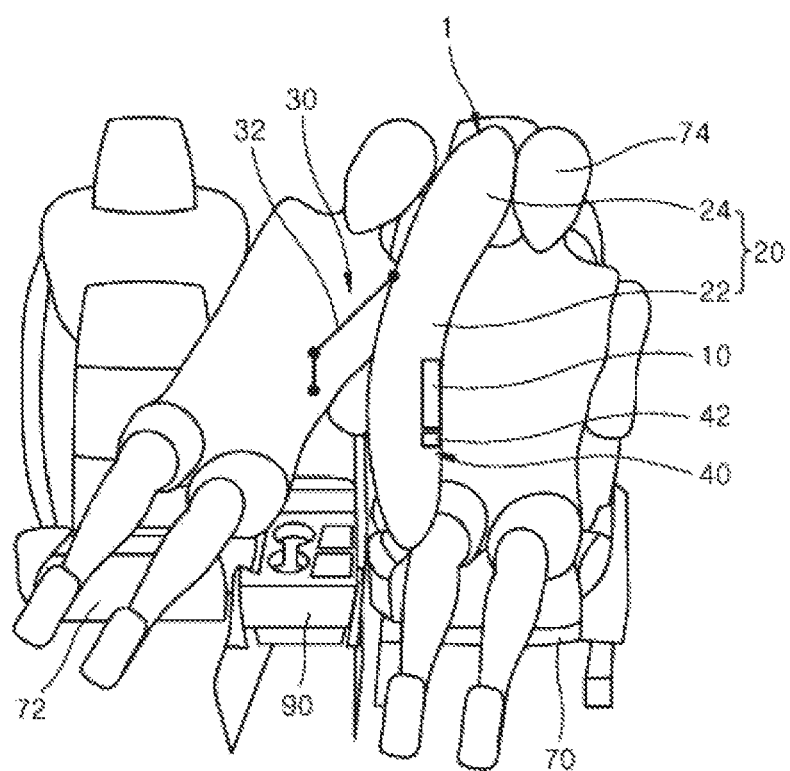
FIG. 4 is a diagram illustrating a state in which the airbag device for a car in accordance with the exemplary embodiment of the present invention is deployed between an occupant and fellow occupant.
Figure 5:
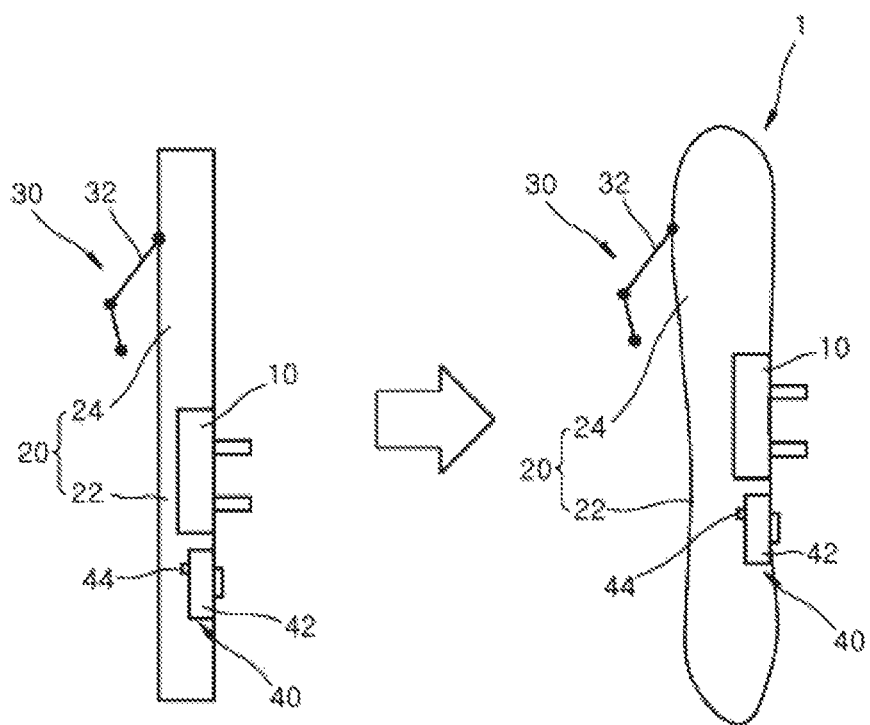
FIG. 5 is a front view schematically illustrating a state in which the airbag device for a car in accordance with an exemplary embodiment of the present invention is operated in a dual mode.
Figure 6:
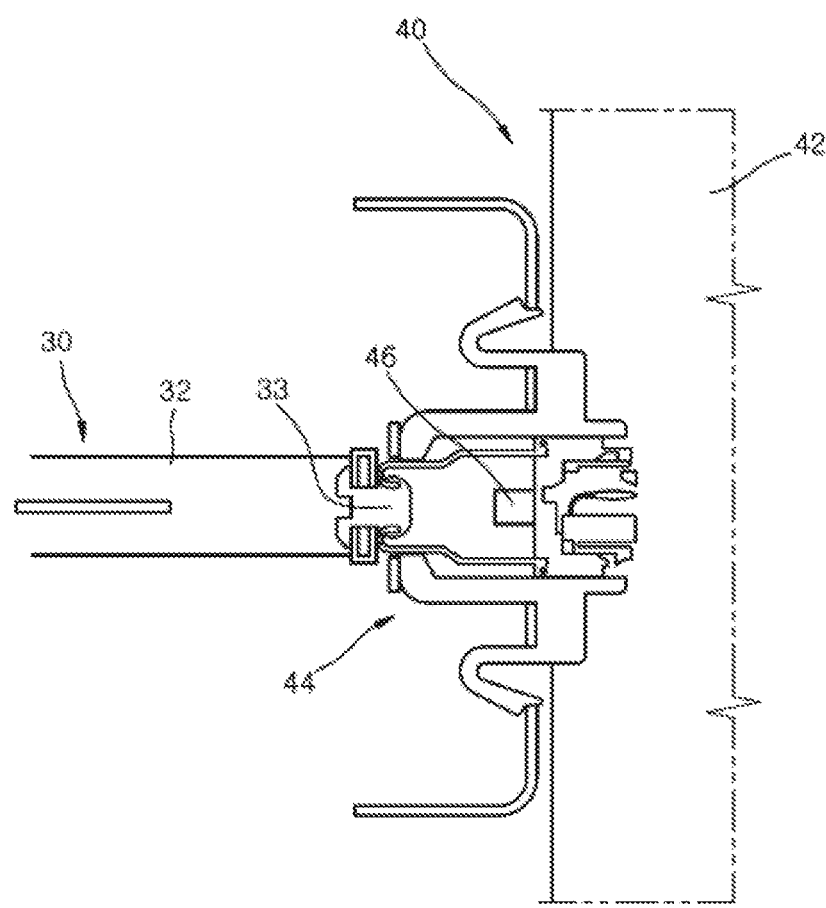
FIG. 6 is a cross-sectional view illustrating a state in which an insertion protrusion of a tether part in accordance with the exemplary embodiment of the present invention is inserted into a connector part of a locking release part.
Figure 7:
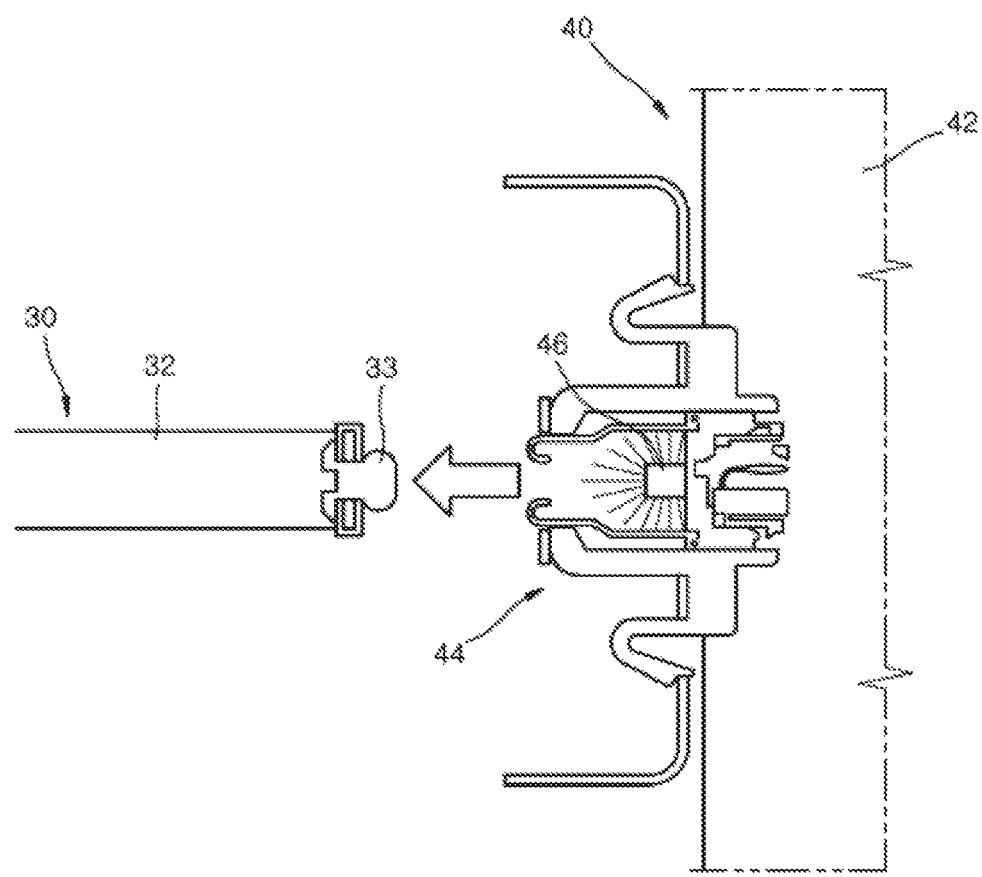
FIG. 7 is a cross-sectional view illustrating a state in which a gas generator in accordance with the exemplary embodiment of the present invention is operated to separate the insertion protrusion of the tether part from the connector part.
Figure 8:
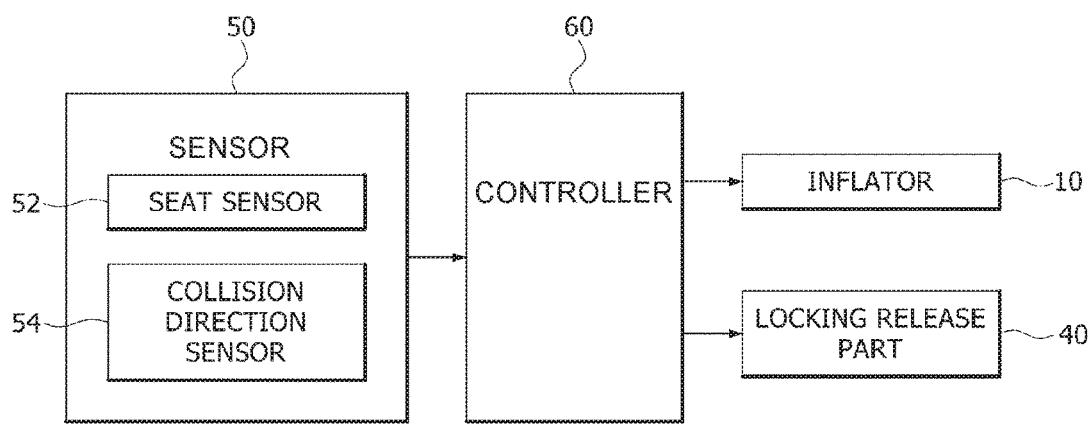
FIG. 8 is a block diagram of the airbag device for a car in accordance with the exemplary embodiment of the present invention.

FIG. 1 is a front view schematically illustrating a state in which an airbag device for a car in accordance with an exemplary embodiment of the present invention is installed, FIG. 2 is a front view schematically illustrating a state in which the airbag device for a car in accordance with the exemplary embodiment of the present invention is operated in a single mode, FIG. 3 is a diagram schematically illustrating a state in which a seat sensor in accordance with the exemplary embodiment of the present invention is installed, FIG. 4 is a diagram illustrating a state in which the airbag device for a car in accordance with the exemplary embodiment of the present invention is deployed between an occupant and fellow occupant, FIG. 5 is a front view schematically illustrating a state in which the airbag device for a car in accordance with the exemplary embodiment of the present invention is operated in a dual mode, FIG. 6 is a cross-sectional view illustrating a state in which an insertion protrusion of a tether part in accordance with the exemplary embodiment of the present invention is inserted into a connector part of a locking release part, FIG. 7 is a cross-sectional view illustrating a state in which a gas generator in accordance with the exemplary embodiment of the present invention is operated to separate the insertion protrusion of the tether part from the connector part, and FIG. 8 is a block diagram of the airbag device for a car in accordance with the exemplary embodiment of the present invention.

As illustrated in FIGS. 1 and 2, the airbag device 1 for a car in accordance with an exemplary embodiment of the present invention may include an inflator 10, a chamber part 20, a tether part 30, and a locking release part 40. The inflator 10 may be positioned between first and second seats 70 and 72 to generate an operating gas, the chamber part 20 may receive the operating gas generated by the inflator 10 and expand between the first and second seats 70 and 72, the tether part 30 may be connected to the chamber part 20 to control the deployment shape of the chamber part 20, and the locking release part 40 may be connected to the tether part 30 at the inner surface or side surface of the chamber part 20, and remove the connection to the tether part 30 according to a control signal.

The inflator 10 may be modified in various manners as long as the inflator 10 can generate an operating gas to expand the chamber part 20 while being positioned between the first and second seats 70 and 72. The inflator 10 may be fixed to the first or second seat 70 or 72, and fixed to the car body including a console box.

The chamber part 20 may be deployed in various shapes as long as the chamber part 20 can receive the operating gas generated by the inflator 10 and expand between the first and second seats 70 and 72. The chamber part 20 may include first and second chambers 22 and 24.

The first chamber 22 may be installed in a shape covering the outsides of the inflator 10 and the locking release part 40, and expanded in the top and bottom direction between the first and second seats 70 and 72 by the operation of the inflator 10. In the first chamber 22, the inflator 10 and the locking release part 40 may be positioned. When the inflator 10 is operated, the first chamber 22 may be deployed upward and downward from the inflator 10, and restrict a lateral motion of an occupant 74.

The second chamber 24 may be extended from the top of the first chamber 22, and have a deployment shape guided by the tether part 30 connected to the outside thereof. As illustrated in FIG. 1, the second chamber 24 may be bent and expanded in the direction from the top of the first chamber 22 to the bottom of the first chamber 22 in the single mode where only the occupant 74 is seated in the first seat 70. Alternatively, as illustrated in FIG. 4, the second chamber 24 may be expanded toward the top of the first chamber 22 in the dual mode where the occupant 74 is seated in the first seat 70 and a fellow occupant 76 is seated in the second seat.

As illustrated in FIGS. 1 and 4, the deployment shape of the second chamber 24 may be controlled depending on whether a first tether 32 connected to the outside of the second chamber 24 is connected to the locking release part 40.

The tether part 30 in accordance with the present exemplary embodiment may include the first tether 32 connecting the locking release part 40 and the outside of the second chamber 24. The first tether 32 may be formed in a string shape. One side of the first tether 32 may be fixed to the outside of the second chamber 24, and the other side of the first tether 32 may be connected to the locking release part 40.

As illustrated in FIGS. 6 and 7, the first tether 32 may have an insertion protrusion 33 connected to the other side thereof, and the insertion protrusion 33 may be connected to a connector part 44 of the locking release part 40. The insertion protrusion 33 may be formed in a shape protruding from the first tether 32 toward the locking release part 40, and inserted into a connector part 44 of the locking release part 40.

The locking release part 40 may be formed in various shapes as long as the locking release part 40 can be connected to the tether part 30 at the inner surface or side surface of the chamber part 20 and remove the connection to the tether part 30 according to a control signal. The locking release part 40 in accordance with the present exemplary embodiment may include a locking body 42, the connector part 44, and the gas generator 46.

The locking body 42 may be fixed to the inside of the chamber part 20. The connector part 44 may be installed at a side surface of the locking body 42, and have an inner space into which the insertion protrusion 33 formed at the other side of the tether part 30 is inserted. The number of connector parts 44 may be equal to the number of tethers included in the tether part 30.

As illustrated in FIGS. 6 to 8, the gas generator 46 may be positioned in the connector part 44, and generate an expansion gas according to a control signal of the controller 60. Therefore, the gas generator 46 may separate the tether part 30 from the connector part 44. The gas generators 46 may be installed in the inner spaces of the respective connector parts 44, and separately operated according to the control signal of the controller 60. Therefore, the tether part 30 connected to a location where the gas generator 46 is operated to ignite powder may be separated from the locking release part 40, and the tether part 30 connected to a location where the gas generator 46 is not operated may maintain the connection to the locking release part 40.

As illustrated in FIGS. 3 and 8, the controller 60 may operate the inflator 10 and the locking release part 40, based on information on whether a seat belt 80 is connected to a seat belt buckle 82 and sensed values of a seat sensor 52 and a collision direction sensor 54 in a sensor 50, when the information and the sensed values are transmitted to the controller 60.

The sensor 50 may include various types of sensors as long as the sensor 50 can sense whether occupants are seated in the first and second seats 70 and 72 and the collision direction of the car. The sensor 50 in accordance with the exemplary embodiment of the present invention may include the seat sensor 52 and the collision direction sensor 54.

The seat sensor 52 may be installed under the seats of the car including the first and second seats 70 and 72, and sense whether the occupant 74 or fellow occupant 76 is seated. The collision direction sensor 54 may sense the collision direction of the car while sensing a collision of the car, and transmit the sensed values to the controller 60.

Furthermore, the sensor 50 may include a separate sensor for determining whether the seat belt 80 installed at each seat is coupled to the seat belt buckle 82, and transmitting the determination result to the controller 60.

Since the controller 60 may receive the sensed values of the sensor 50 and controls the operation of the locking release part 40, the controller 60 may control the deployment shape of the chamber part 20 in the single mode and the dual mode.

Hereafter, the operation of the airbag device 1 for a car in accordance with the exemplary embodiment of the present invention will be described in detail with reference to the accompanying drawings.

As illustrated in FIGS. 1, 2 and 8, when the driver seat is set to the first seat 70 and the passenger seat is set to the second seat 72, the seat sensor 52 may sense whether an occupant is seated in the second seat 72, and send the sensed value to the controller 60. The controller 60 may decide whether the occupant is seated and the deployment mode of the chamber part 20, based on the sensed value of the sensor 50.

The deployment mode may be divided into the single mode in which the occupant 74 is seated only in the first seat 70 set to the driver seat and the dual mode in which the fellow occupant 76 is also seated in the second seat 72.

Furthermore, a collision mode may include a near side collision in which an external impact is applied to the side of the driver seat and a far side collision in which an external impact is applied to the side of the passenger seat.

The controller 60 may control the deployment shape for each of the collision modes, and operate the locking release part 40 serving as a tether release device to decide the operating condition of the tether part 30 serving as an external tether depending on whether occupants are seated. Therefore, the controller 60 may control the full deployment shape of the chamber part 20.

In the single mode where only the occupant 74 is seated in the first seat 70, the first tether 32 may maintain a connection to the locking release part 40. Furthermore, since the length of the first tether 32 may be shorter than the length of the second chamber 24, the second chamber 24 may be deployed while being bent from the top to bottom of the first chamber 22.

Since the first tether 32 serving as an external tether guides the deployment of the second chamber 24 while maintaining tension, the chamber part 20 may be formed in a U-shape that is convex toward the top. In this case, since the width of the chamber part 20 corresponds to a value obtained by adding the width of the space between the first and second chambers 22 and 24 to the widths of the first and second chambers 22 and 24, the widthwise volume of the chamber part 20 may be increased. Therefore, since the occupant 74 seated in the first seat 70 is restricted from moving toward the second seat 72, an injury of the occupant 74 can be reduced. That is, in the single mode, the width of the chamber part 20 may be increased much more than the width of the first or second chamber 22 or 24.

As illustrated in FIGS. 4, 5 and 8, the locking release part 40 may be operated to separate the first tether 32 from the locking release part 40 in the dual mode where the occupant 74 is seated in the first seat 70 and the fellow occupant 76 is seated in the second seat 72.

Since tension to pull the second chamber 24 through the first tether 32 is removed, the second chamber 24 may be extended toward the top of the first chamber 22. Since the bottom of the first chamber 22 is fixed to the first seat 70 or the console box 90 and the second chamber 24 is extended toward the top of the first chamber 22, a partition wall-shaped structure may be formed between the occupant 74 and the fellow occupant 76. Therefore, the structure can prevent a collision between the heads of the occupant 74 and the fellow occupant 76, thereby reducing an injury caused by a contact. Furthermore, the structure can normally protect the upper bodies of the occupant 74 and the fellow occupant 76 from the chests to the heads.

The existing center airbags can protect only occupants in the dual mode. However, the airbag device 1 for a car in accordance with the exemplary embodiment of the present invention can automatically distinguish between the single mode and the dual mode, and protect occupants according to each situation.

Hereafter, an airbag device 2 for a car in accordance with another exemplary embodiment of the present invention will be described with reference to the drawings.

For convenience of description, components which are configured and operated in the same manner as those of the above-described exemplary embodiment may be represented by like reference numerals, and the detailed descriptions thereof are omitted herein.

Figure 9:
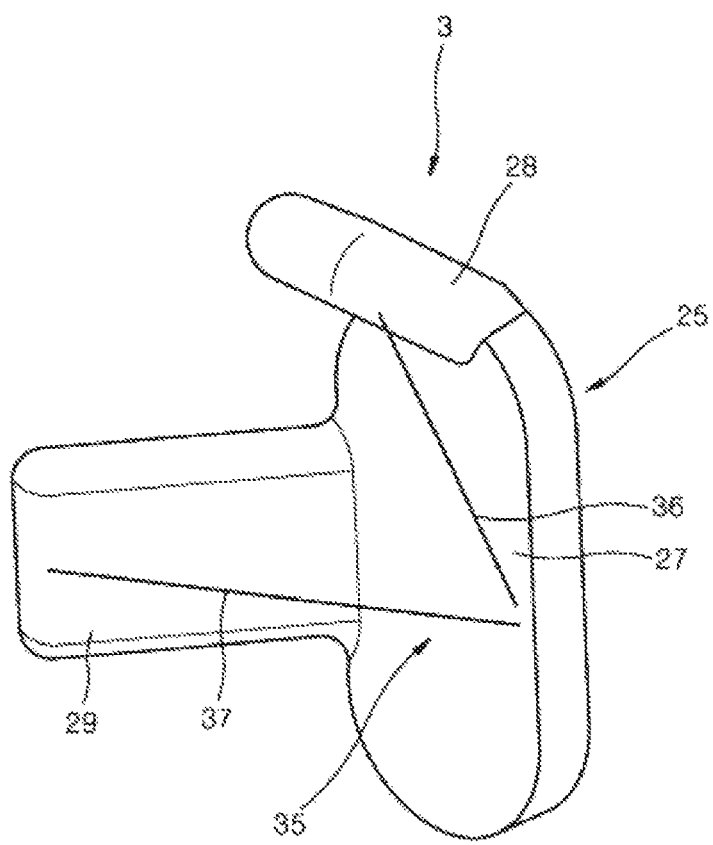
FIG. 9 is a perspective view of an airbag device for a car in accordance with another exemplary embodiment of the present invention.
Figure 10:
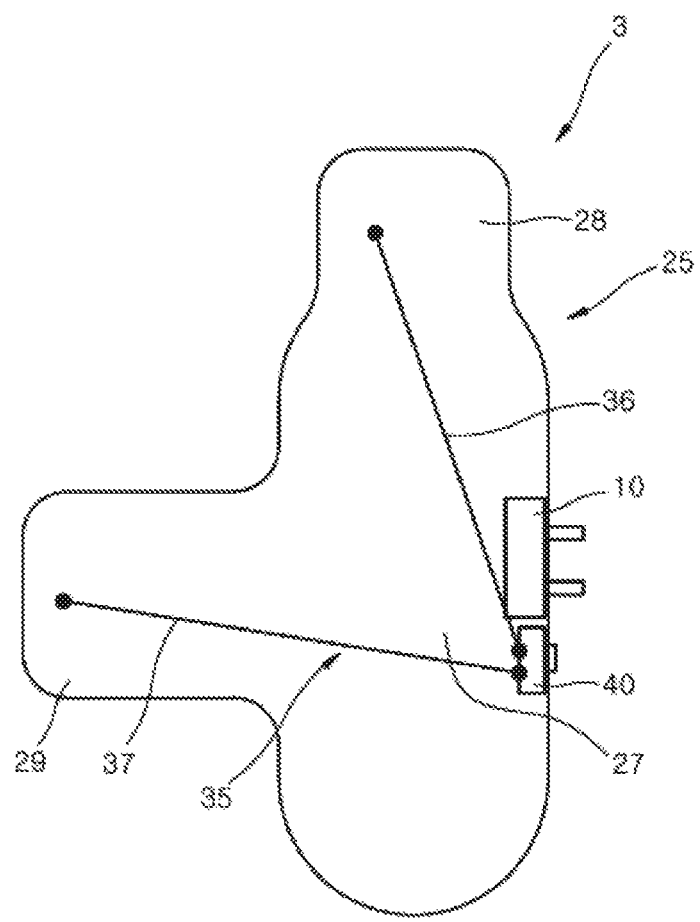
FIG. 10 is a front view of the airbag device for a car in accordance with the exemplary embodiment of the present invention.

FIG. 9 is a perspective view of an airbag device for a car in accordance with another exemplary embodiment of the present invention, and FIG. 10 is a front view of the airbag device for a car in accordance with the exemplary embodiment of the present invention.

As illustrated in FIGS. 9 and 10, a chamber part 25 of the airbag device 2 for a car in accordance with the exemplary embodiment of the present invention may include a first chamber 27, a second chamber 28 and a third chamber 29.

Since the first chamber 27 performs the same function as that of the above-described exemplary embodiment, the detailed descriptions thereof are omitted herein. The second chamber 28 may be connected to the top of the first chamber 27, and the third chamber 29 may be connected to a side surface of the front of the second chamber 28.

The second chamber 28 may be expanded toward the top of the first chamber 27 in the dual mode, and bent and expanded toward the top of the head of the occupant 74 from the top of the first chamber 27 in the single mode.

The third chamber 29 may be extended laterally from the first chamber 27, and may have a deployment shape guided by a tether part 35 connected to the outside thereof. Since the third chamber 29 is expanded while being bent at the front of the first chamber 27 so as to cover the occupant 74, the third chamber 29 may restrict a motion of the occupant 74.

The tether part 35 for guiding the deployment of the chamber part 25 may include a first tether 36 and a second tether 37. The first tether 36 may connect the locking release part 40 to the outside of the second chamber 28, and the second tether 37 may connect the locking release part 40 to the outside of the third chamber 29.

As illustrated in FIG. 9, when the chamber part 25 is fully deployed in the single mode, the second chamber 28 may be deployed toward the top of the head of the occupant and block the head of the occupant from moving over the first chamber 27, and the third chamber 29 may be deployed in a shape covering the front chest of the occupant 74 and restrict a movement of the occupant 74.

In accordance with the exemplary embodiment of the present invention, when the sensor 50 senses whether an occupant is seated and the collision direction of the car and transmits the sensed values to the controller 60, the controller 60 can control the deployment of the chamber part 20 or 25, and modify the deployment shape of the chamber part 20 or 25 depending on the seated state of the occupant, thereby reducing the injury of the occupant.

The sensor 50, controller 60, and/or one or more components thereof, may be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like. In this manner, the features, functions, processes, etc., described herein may be implemented via software, hardware (e.g., general processor, digital signal processing (DSP) chip, an application specific integrated circuit (ASIC), field programmable gate arrays (FPGAs), etc.), firmware, or a combination thereof. As such, sensor 50, controller 60, and/or one or more components thereof may include or otherwise be associated with one or more memories (not shown) including code (e.g., instructions) configured to cause the sensor 50, controller 60, and/or one or more components thereof to perform one or more of the features, functions, processes, etc., described herein.

The memories may be any medium that participates in providing code to the one or more software, hardware, and/or firmware components for execution. Such memories may be implemented in any suitable form, including, but not limited to, non-volatile media, volatile media, and transmission media. Non-volatile media include, for example, optical or magnetic disks. Volatile media include dynamic memory. Transmission media include coaxial cables, copper wire, and fiber optics. Transmission media can also take the form of acoustic, optical, or electromagnetic waves. Common forms of computer-readable media include, for example, a floppy disk, a flexible disk, hard disk, magnetic tape, any other magnetic medium, a compact disk-read only memory (CD-ROM), a rewriteable compact disk (CDRW), a digital video disk (DVD), a rewriteable DVD (DVD-RW), any other optical medium, punch cards, paper tape, optical mark sheets, any other physical medium with patterns of holes or other optically recognizable indicia, a random-access memory (RAM), a programmable read only memory (PROM), and erasable programmable read only memory (EPROM), a FLASH-EPROM, any other memory chip or cartridge, a carrier wave, or any other medium from which information may be read by, for example, a controller/processor.

Although exemplary embodiments of the present disclosure have been shown and described hereinabove, the present disclosure is not limited to specific exemplary embodiments described above, but may be various modified by those skilled in the art to which the present disclosure pertains without departing from the scope and spirit of the disclosure as disclosed in the accompanying claims. In addition, such modifications should also be understood to fall within the scope and spirit of the present disclosure.

What is claimed is:

1. An airbag device for a car, comprising:
    an inflator positioned between first and second seats, and generating an operating gas;
    a chamber part receiving the operating gas generated by the inflator and expanding between the first and second seats;
    a tether part connected to the chamber part to control a deployment shape of the chamber part; and
    a locking release part connected to the tether part at an inner surface or side surface of the chamber part which removes a connection to the tether part according to a control signal;
    wherein the chamber part comprises:
    a first chamber installed in a shape covering outsides of the inflator and the locking release part, and expanded in top and bottom directions between the first and second seats by an operation of the inflator; and
    a second chamber extended from a top of the first chamber, and having a deployment shape guided by the tether part connected to an outside thereof.

2. The airbag device of claim 1, further comprising:
    a sensor configured to sense whether occupants are seated in the first and second seats and a collision direction of the car; and
    a controller configured to receive sensed values of the sensor and control an operation of the locking release part.

3. The airbag device of claim 2, wherein the locking release part comprises:
    a locking body fixed to the inside of the chamber part;
    a connector part installed on the locking body and having an internal space into which the other side of the tether part is inserted; and
    a gas generator positioned in the connector part, and separating the tether part from the connector part by generating an expansion gas according to the control signal of the controller.

4. The airbag device of claim 1, wherein the second chamber is expanded toward the top of the first chamber or expanded while being bent from the top to bottom of the first chamber.

5. The airbag device of claim 1, wherein the tether part comprises a first tether connecting the locking release part to an outside of the second chamber.

6. The airbag device of claim 5, wherein the first tether has an insertion protrusion connected thereto, and the insertion protrusion is inserted and coupled into a connector part of the locking release part.

7. The airbag device of claim 1, wherein the chamber part further comprises a third chamber extended laterally from the first chamber, and having a deployment shape guided by the tether part connected to the outside thereof.

8. The airbag device of claim 7, wherein the second chamber is expanded toward the top of the first chamber or expanded while being bent from the top of the first chamber, and the third chamber is expanded while being bent at the front of the first chamber.

9. The airbag device of claim 7, wherein the tether part comprises:

a first tether connecting the locking release part to the outside of the second chamber; and a second tether connecting the locking release part to the outside of the third chamber.

* * * * *